(12) United States Patent
Choi et al.

(10) Patent No.: US 12,326,108 B1
(45) Date of Patent: Jun. 10, 2025

(54) SYSTEM AND METHOD FOR DETERMINING AVAILABLE ENGINE TORQUE BASED ON COLD LIGHT OFF CATALYST

(71) Applicant: FCA US LLC, Auburn Hills, MI (US)

(72) Inventors: Jeongyong Choi, Rochester, MI (US); Michael Barkey, Maidstone (CA); William Attard, Brighton, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/526,001

(22) Filed: Dec. 1, 2023

(51) Int. Cl.
  *F02B 37/18* (2006.01)
  *F01N 3/28* (2006.01)
  *F02B 37/12* (2006.01)
  *F02B 37/22* (2006.01)
  *F02D 41/00* (2006.01)
  *F01N 3/20* (2006.01)

(52) U.S. Cl.
  CPC .......... *F02B 37/183* (2013.01); *F01N 3/2892* (2013.01); *F02B 37/12* (2013.01); *F02B 37/18* (2013.01); *F02B 37/186* (2013.01); *F02B 37/22* (2013.01); *F02D 41/0007* (2013.01); *F01N 3/2006* (2013.01)

(58) Field of Classification Search
  CPC ........ F02B 37/12; F02B 37/18; F02B 37/183; F02B 37/186; F02B 37/22; F02D 41/0007; F02D 41/2429–2483; F01N 3/2006; F01N 3/2892
  See application file for complete search history.

(56) References Cited

U.S. PATENT DOCUMENTS

| | | | |
|---|---|---|---|
| 2019/0285005 A1* | 9/2019 | Nakamura | F02D 41/04 |
| 2020/0095913 A1* | 3/2020 | Rohde | F01N 3/208 |

\* cited by examiner

*Primary Examiner* — Loren C Edwards
(74) *Attorney, Agent, or Firm* — Jeremy J. Klobucar

(57) ABSTRACT

A control system for an engine comprising a turbocharger includes, a cold light off catalyst (CLOC), a CLOC valve, and a controller. The CLOC is positioned in a bypass passage around a turbine of the turbocharger. The CLOC valve selectively routes exhaust flow from the engine between the turbine and the CLOC. The controller is configured to command the CLOC valve to operate in a CLOC mode whereby exhaust flow is routed to the CLOC; determine, based on operation in the CLOC mode, a position of the CLOC valve; determine, based on the position of the CLOC valve, an available torque of the engine; and set a maximum available engine torque based on the determined available torque of the engine.

6 Claims, 3 Drawing Sheets

SYSTEM AND METHOD FOR DETERMINING AVAILABLE ENGINE TORQUE BASED ON COLD LIGHT OFF CATALYST

FIELD

The present application generally relates to turbochargers and, more particularly, to techniques for determining available engine torque based on positioning of a valve that directs exhaust flow around the turbocharger and into a cold light off catalyst.

BACKGROUND

As is known, pollutant emissions such as nitrogen oxides (NOx), carbon monoxide (CO), and hydrocarbon (HC) are temperature sensitive in aftertreatment systems. Such emission conversion begins at high temperatures such as over 350 C depending on catalyst formulation. Typically at engine startup, idle exhaust temperatures are much below the high temperatures needed for optimal catalyst efficiencies. In particular, an amount of time is needed for the exhaust to heat up from the typical exhaust temperatures to the elevated temperatures that satisfy a desired efficiency target. Operation of the engine during this heating up time is inefficient for conversion of such pollutants. Accordingly, a need exists in the art to improve upon efficiencies of aftertreatment systems.

SUMMARY

According to one example aspect of the invention, a control system for an engine comprising a turbocharger includes, a cold light off catalyst (CLOC), a CLOC valve, and a controller. The CLOC is positioned in a bypass passage around a turbine of the turbocharger. The CLOC valve selectively routes exhaust flow from the engine between the turbine and the CLOC. The controller is configured to command the CLOC valve to operate in a CLOC mode whereby exhaust flow is routed to the CLOC; determine, based on operation in the CLOC mode, a position of the CLOC valve; determine, based on the position of the CLOC valve, an available torque of the engine; and set a maximum available engine torque based on the determined available torque of the engine.

In some implementations, commanding the CLOC valve to operate in the CLOC mode comprises commanding the CLOC valve to a position wherein exhaust flow is directed to the CLOC thereby reducing rotation of the turbine.

In other implementations, the controller is configured to determine a first known engine torque available for a plurality engine speeds when the CLOC valve is fully open, wherein fully open corresponds to all exhaust flow directed into the turbine.

In additional implementations, the controller is configured to determine a second known engine torque available for the plurality of engine speeds when the CLOC valve is fully closed in the CLOC mode, wherein fully closed corresponds to all exhaust flow diverted from the turbine and directed instead into the CLOC.

In additional implementations, the controller is further configured to compare the first and second known engine torques with the CLOC valve in the fully open and fully closed positions with the determined position of the CLOC valve.

According to another aspect of the invention, a method for controlling an engine comprising a turbocharger includes commanding operation of a cold light off catalyst (CLOC) positioned in a bypass passage around a turbine of the turbocharger, the commanding including commanding a CLOC valve to operate in a CLOC mode whereby exhaust flow is routed, at least partially, to the CLOC; determining, based on operation in the CLOC mode, a position of the CLOC valve; determining, based on the position of the CLOC valve, an available torque of the engine; and setting a maximum available engine torque based on the determined available torque of the engine.

In some implementations, the method further includes commanding the CLOC valve to operate in the CLOC mode comprises commanding the CLOC valve to a position wherein exhaust flow is directed to the CLOC thereby reducing rotation of the turbine.

In other implementations, the method further includes reducing rotation of the turbine results in reducing rotation of a compressor rotatably coupled to the turbine, wherein reducing rotation of the compressor causes reduced airflow into the engine.

In additional implementations, the method further includes determining a first known engine torque available for a plurality engine speeds when the CLOC valve is fully open, wherein fully open corresponds to all exhaust flow directed into the turbine.

In additional implementations, the method further includes determining a second known engine torque available for the plurality of engine speeds when the CLOC valve is fully closed in the CLOC mode, wherein fully closed corresponds to all exhaust flow diverted from the turbine and directed instead into the CLOC.

In additional implementations, determining, based on the position of the CLOC valve, an available torque of the engine comprises comparing the first and second known engine torques with the CLOC valve in the fully open and fully closed positions with the determined position of the CLOC valve.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

The present disclosure is directed toward emission control on turbocharged engines. A system and related techniques are described for controlling a cold start light off catalyst (CLOC) where a CLOC valve is controlled to divert exhaust gas from the turbine of the turbocharger and through a small catalyst in a CLOC mode. The CLOC can achieve high efficiency quickly to treat the exhaust gas, while a much larger downstream catalyst is warming up. During full rerouting of the exhaust from the turbocharger and to the CLOC, exhaust flow is precluded from flowing through the turbine of the turbocharger. When the CLOC valve is fully closed (during CLOC mode), the turbine is not being spun by exhaust flow, and therefore it provides no assisting rotation to the compressor. Instead, the compressor acts merely as a restriction to intake airflow into the engine. In this regard, available engine torque is reduced based on the position of the CLOC valve. The techniques of the instant disclosure model the available engine torque based on the position of the CLOC valve and set the maximum engine torque based on the position of the CLOC valve.

Figure 1:
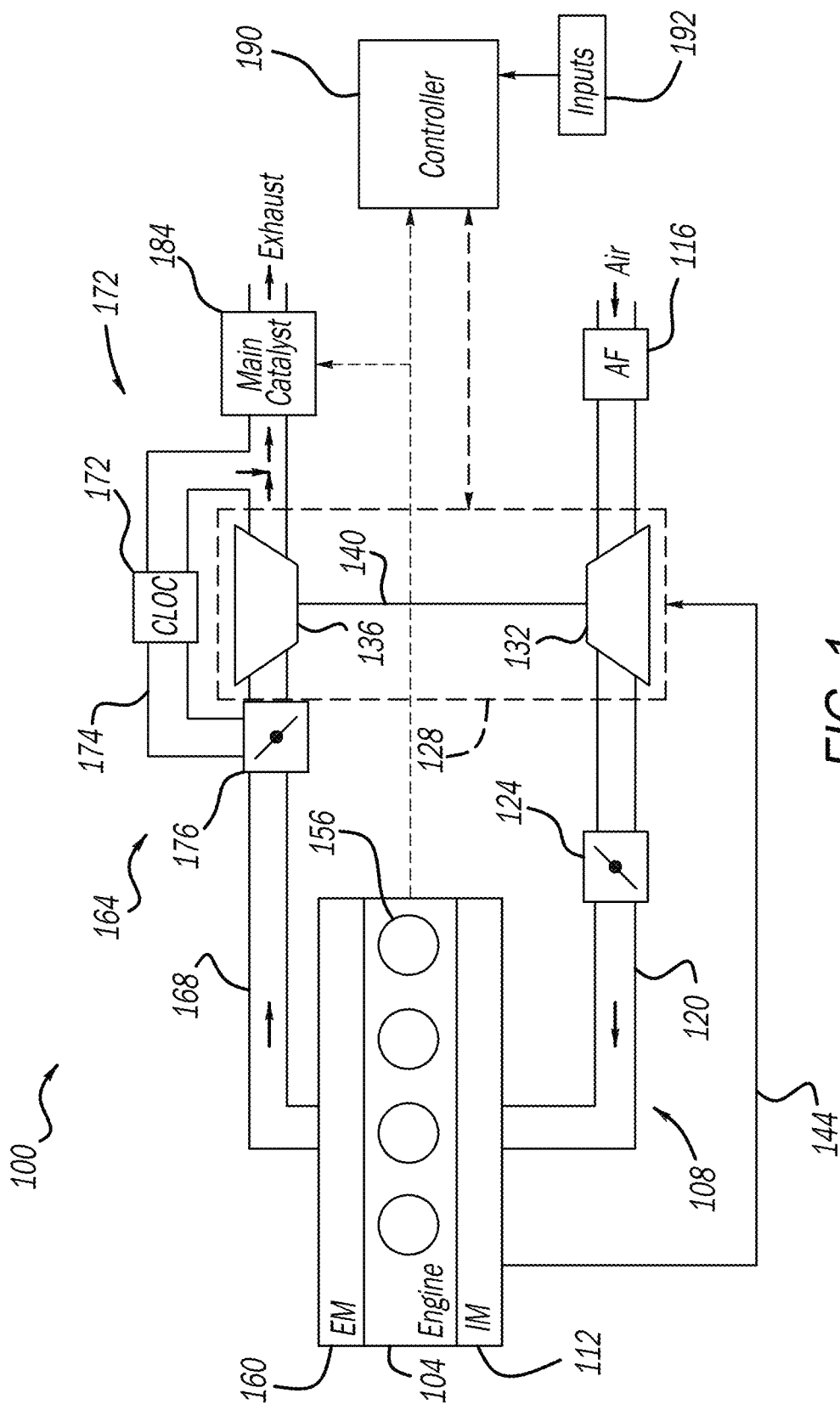
FIG. 1 is a diagram of an example vehicle comprising a turbocharged engine incorporating a cold light off catalyst (CLOC) and CLOC valve according to the principles of the present disclosure.

Referring now to FIG. 1, a diagram of an example vehicle 100 is illustrated. The vehicle 100 includes an engine 104 configured to combust an air/fuel mixture to generate drive torque. The engine 104 includes an intake system 108 that draws fresh air into an intake manifold (IM) 112 through an air filter (AF) 116 and an induction passage 120. A throttle valve 124 regulates a flow of air through the induction passage 120. A turbocharger 128 comprises a compressor 132 (e.g., a centrifugal compressor) that pressurizes or forces the air through the induction passage 120. The compressor 132 is coupled to a turbine 136 (e.g., a twin-scroll turbine) of the turbocharger 136 via a shaft 140.

The pressurized air is distributed to a plurality of cylinders 156 and combined with fuel (e.g., from respective direct-injection or port-injection fuel injectors) to form an air/fuel mixture. While four cylinders are shown, it will be appreciated that the engine 104 could include any number of cylinders. The air/fuel mixture is compressed by pistons (not shown) within the cylinders 156 and combusted (e.g., via spark from respective spark plugs) to drive the pistons, which turn a crankshaft (not shown) to generate drive torque. The drive torque is then transferred to a driveline (not shown) of the vehicle 100, e.g., via a transmission (not shown). Exhaust gas resulting from combustion is expelled from the cylinders 156 and into an exhaust manifold (EM) 160 of the engine 104.

The exhaust gas from the exhaust manifold 160 is provided to an exhaust system 164 comprising an exhaust passage 168. Kinetic energy of the exhaust gas drives the turbine 136, which in turn drives the compressor 132 via the shaft 140. A cold light off catalyst (CLOC) 172 is routed in a bypass passage 174 around the turbine 136. A CLOC valve 176 selectively controls exhaust flow into the turbine 136 of the turbocharger 128 and/or into the CLOC 172 via the bypass passage 174. Explained further, the CLOC valve 176 moves between a fully open position whereby all exhaust gas is routed to the turbine 136, a fully closed position whereby all exhaust gas is routed to the CLOC 172, and infinite positions therebetween causing a blend of exhaust to be routed to both of the turbine 136 and the CLOC 172.

As used herein a "CLOC mode" is used to refer to the controller 190 commanding the CLOC valve 176 to rout at least some exhaust to the CLOC 172. A main exhaust gas treatment system 184, such as a catalytic converter, treats exhaust gas to decrease or eliminate emissions before it is released into the atmosphere. All exhaust gas regardless of passing through the turbine 136 or the CLOC 172 is directed to the main exhaust gas treatment system 184. The CLOC 172 includes a small catalyst that can reach high efficiency quickly and treat the exhaust gas such as when the main catalyst 184 has yet to reach optimal operating temperature.

Lubrication oil from the engine 104 is routed through an oil line 144 to the turbocharger 128 to lubricate components of the turbocharger 128. In examples, the oil is sourced from the engine 104 at the sump.

A controller, also referred to herein as an engine controller, 190 controls operation of the vehicle 100. Examples of components controlled by the controller 190 include the engine 104, the throttle valve 124, and the CLOC valve 176. It will be appreciated that the controller 190 controls specific components of the vehicle 100 that are not illustrated, such as, but not limited to, fuel injectors, spark plugs, an EGR valve, a VVC system (e.g., intake/exhaust valve lift/actuation), a transmission, and the like. The controller 220 controls operation of these various components based on measured and/or modeled parameters. Inputs 192 such as one or more sensors are configured to measure one or more parameters, and communicate signals indicative thereof to the controller 190 (pressures, temperatures, speeds, etc.) as discussed in greater detail herein. Other parameters could be modeled by the controller 190, e.g., based on other measured parameters. The controller 190 is also configured to perform the engine/turbocharger control techniques.

Figure 2:
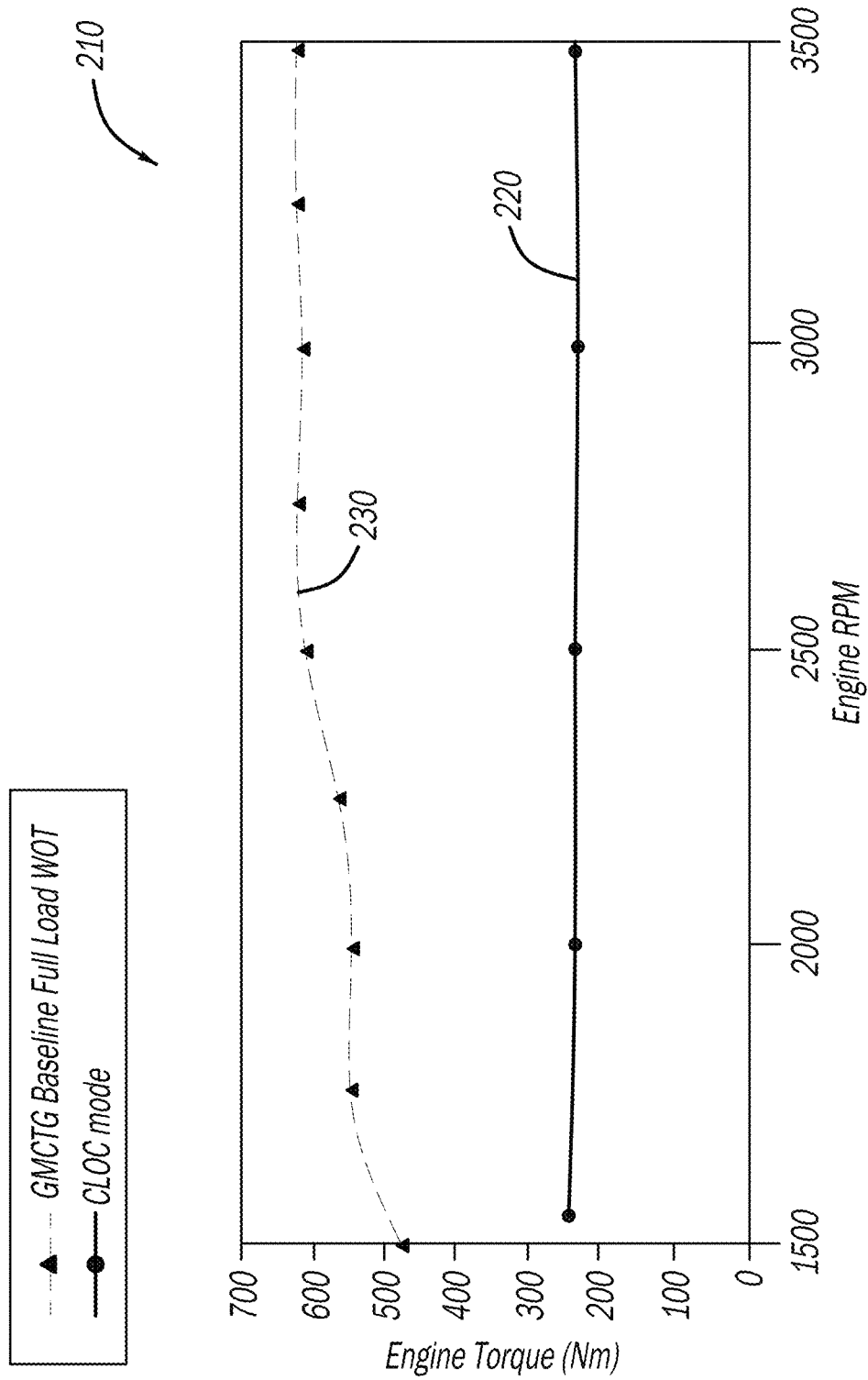
FIG. 2 is a graph illustrating engine RPM versus engine torque during CLOC mode and without CLOC mode according to the principles of the present disclosure.

With additional reference now to FIG. 2, During operation of the CLOC 172, and specifically when the CLOC valve 176 is fully closed, zero exhaust flow contributes to the spinning the turbine 136 (and therefore the compressor 132). This condition causes a restriction or blockage at the compressor 132 and therefore reduced airflow is available to be directed into the engine 104. As is known, reduced airflow into the engine 104 results in reduced available engine torque. The techniques described herein model the available engine torque based on the position of the CLOC valve and set the maximum engine torque based on the position of the CLOC valve.

With reference to FIG. 2, exemplary engine RPM versus engine torque is shown for an engine in full CLOC mode (CLOC valve fully closed routing all exhaust air away from the turbine 136 and into the CLOC 172) and for an engine not in CLOC mode (CLOC valve fully open routing all exhaust air into the turbine 136 and not into the CLOC 172). As indicated, an engine running in full CLOC mode 220 provides an available engine torque between 200 and 300 Nm. In contrast, an engine not running in CLOC mode 230 provides an available engine torque between 450 and 650 Nm. In this regard, available engine torque is significantly reduced in full CLOC mode. In examples, the techniques herein model the position of the CLOC valve (intermediate positions between completely closed and completely open) to available torques between the traces 220 and 230.

Figure 3:
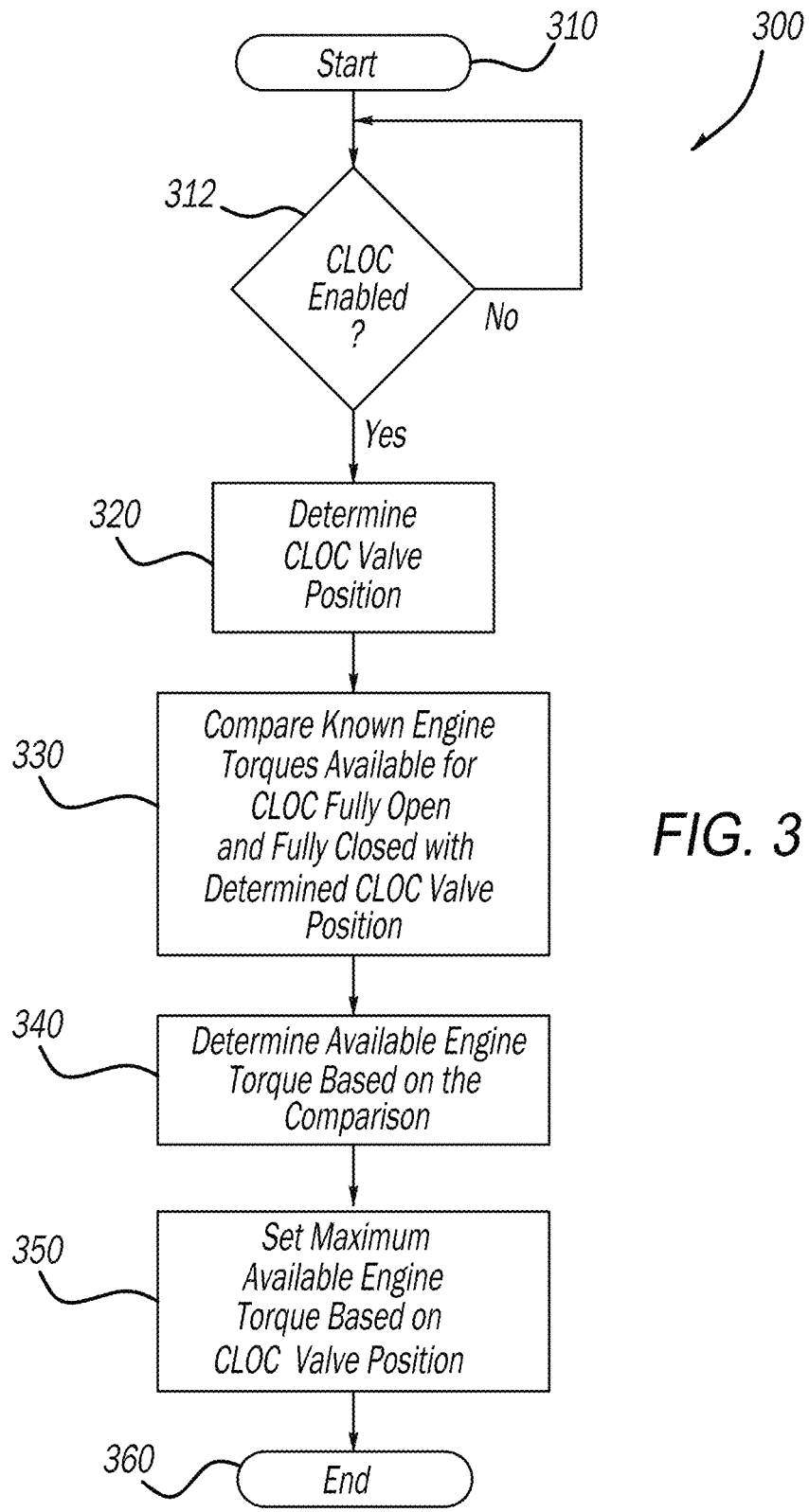
FIG. 3 is a flow diagram of an example method of determining available engine torque based on positioning of a CLOC valve that directs exhaust flow around the turbocharger and into a cold light off catalyst according to the principles of the present disclosure.

Referring now to FIG. 3, a flow chart of an example method 300 of operating the engine 104 having the turbocharger 128, CLOC 172, and CLOC valve 176 is illustrated. For explanatory purposes, components of the vehicle 100 will be referenced, but it will be appreciated that this method 300 could be used for any engine having a turbocharger and CLOC. Control starts at 310. At 312, the controller 190 determines whether CLOC is enabled. Again, CLOC operation can be enabled such as at startup of the engine 104 when the main catalyst 184 has not reached optimal operating temperature. At 320 control determines a position of the CLOC valve 176. The position of the CLOC valve 176 can be measured or assumed based on signals from the controller 190.

At 330 control compares the known engine torques available for a the CLOC valve 176 fully open (see 220, FIG. 2) and fully closed (see 230, FIG. 3) with the determined position of the CLOC valve 176. At 340 the available engine torque is determined based on the comparison. At 350 control sets a maximum available engine torque based on the determined engine torque (e.g., the position of the CLOC valve 176). Setting the maximum available engine torque can be establishing an available engine torque in an engine calibration or other criteria used by the engine 104 and/or the controller 190 for instructing the engine 104 to produce toque to the driveline.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine comprising a turbocharger, the system comprising:
    a cold light off catalyst (CLOC) positioned in a bypass passage around a turbine of the turbocharger;
    a CLOC valve that selectively routes exhaust flow from the engine between the turbine and the CLOC; and
    a controller configured to:
        command the CLOC valve to operate in a CLOC mode whereby exhaust flow is routed, at least partially, to the CLOC;
        determine a position of the CLOC valve;
        determine, based on the position of the CLOC valve, an available torque of the engine including (i) determining a first known engine torque available for a plurality engine speeds when the CLOC valve is fully open, wherein fully open corresponds to all exhaust flow directed into the turbine; and (ii) determining a second known engine torque available for the plurality of engine speeds when the CLOC valve is fully closed in the CLOC mode, wherein fully closed corresponds to all exhaust flow diverted from the turbine and directed instead into the CLOC;
        compare each of the first known engine torque when the CLOC valve is fully open and the second known engine torque when the CLOC valve is fully closed with the determined position of the CLOC valve; and
        set a maximum available engine torque based on the determined available torque of the engine.

2. The control system of claim 1, wherein commanding the CLOC valve to operate in the CLOC mode comprises commanding the CLOC valve to a position wherein exhaust flow is directed to the CLOC thereby reducing rotation of the turbine.

3. The control system of claim 2, wherein reducing rotation of the turbine results in reducing rotation of a compressor rotatably coupled to the turbine, wherein reducing rotation of the compressor causes reduced airflow into the engine.

4. A method for controlling an engine comprising a turbocharger, the method comprising:
    commanding operation of a cold light off catalyst (CLOC) positioned in a bypass passage around a turbine of the turbocharger, the commanding including commanding a CLOC valve to operate in a CLOC mode whereby exhaust flow is routed, at least partially, to the CLOC;
    determining a position of the CLOC valve;
    determining, based on the position of the CLOC valve, an available torque of the engine; including (i) determining a first known engine torque available for a plurality engine speeds when the CLOC valve is fully open, wherein fully open corresponds to all exhaust flow directed into the turbine; and (ii) determining a second known engine torque available for the plurality of engine speeds when the CLOC valve is fully closed in the CLOC mode, wherein fully closed corresponds to all exhaust flow diverted from the turbine and directed instead into the CLOC;
    comparing each of the first known engine torque when the CLOC valve is fully open and the second known engine torque when the CLOC valve is fully closed with the determined position of the CLOC valve; and
    setting a maximum available engine torque based on the determined available torque of the engine.

5. The method of claim 4, wherein commanding the CLOC valve to operate in the CLOC mode comprises commanding the CLOC valve to a position wherein exhaust flow is directed to the CLOC thereby reducing rotation of the turbine.

6. The method of claim 4, wherein reducing rotation of the turbine results in reducing rotation of a compressor rotatably coupled to the turbine, wherein reducing rotation of the compressor causes reduced airflow into the engine.

* * * * *